(12) United States Patent
Butler

(10) Patent No.: US 7,170,038 B2
(45) Date of Patent: Jan. 30, 2007

(54) MOLDING COMPOUNDS FOR USE IN INDUCTION HEATING APPLICATIONS AND HEATING ELEMENTS MOLDED FROM THESE COMPOUNDS

(75) Inventor: Kurt I. Butler, Kingsville, OH (US)

(73) Assignee: Premix Inc., N. Kingsville, OH (US)

( * ) Notice: Subject to any disclaimer, the term of this patent is extended or adjusted under 35 U.S.C. 154(b) by 0 days.

(21) Appl. No.: 11/114,703

(22) Filed: Apr. 26, 2005

(65) Prior Publication Data

US 2005/0250397 A1   Nov. 10, 2005

Related U.S. Application Data

(60) Provisional application No. 60/565,660, filed on Apr. 27, 2004.

(51) Int. Cl.
*H05B 6/10* (2006.01)
*C08J 11/04* (2006.01)

(52) U.S. Cl. .................. 219/634; 521/46.5
(58) Field of Classification Search ............. 219/634, 219/267, 618; 29/611; 521/46.5; 430/596
See application file for complete search history.

(56) References Cited

U.S. PATENT DOCUMENTS

| | | | |
|---|---|---|---|
| 6,884,975 B2 * | 4/2005 | Matsen et al. | 219/615 |
| 6,914,225 B2 * | 7/2005 | Fischer et al. | 219/634 |
| 2004/0089655 A1 * | 5/2004 | Matsen et al. | 219/602 |
| 2004/0188425 A1 * | 9/2004 | Besmann et al. | 219/634 |
| 2005/0173418 A1 * | 8/2005 | Holzer et al. | 219/634 |

OTHER PUBLICATIONS

Electronically Commutated DC Motor Products for Use in Transit & Tour Coaches; by Henry Roesler. AMETEK Rotron Technical Products Parts & Service Manual for 150068-00/01, Dual Shaft Blower, Rev. A 04/03. Information for this article has in part come from the "Electronically Commutated DC Motor Products for use in Transit Buses" Paper given at the AFTA Bus Operations conference, May, 1992, presented by EG&G Rotron.

* cited by examiner

*Primary Examiner*—Daniel Robinson
(74) *Attorney, Agent, or Firm*—Hudak, Shunk & Farine Co., LPA

(57) ABSTRACT

The invention provides molding compounds that are particularly suitable to be molded into an article such as a heating element that will conduct heat and not burn when an electric current is passed through the article. These compounds are generally liquid thermosetting molding resins which comprise a thermoset resin matrix such as a terephthalate polyester which can include blends of polyester and/or vinyl ester with a significant loading of conductive inorganic filler, typically graphite. The compositions also include flame and sound retardant additives, and glass fibers. They are further formulated to meet the desired molding characteristics; to withstand the operating temperatures to which they will be exposed; and to have a predetermined strength and a desirable user interface including appearance, and odor. Typically, the compounds will have a glass transition temperature from about 160° C. (320° F.) to about 195° C. (383° F.).

9 Claims, 7 Drawing Sheets

US 7,170,038 B2

MOLDING COMPOUNDS FOR USE IN INDUCTION HEATING APPLICATIONS AND HEATING ELEMENTS MOLDED FROM THESE COMPOUNDS

This application is based on U.S. Provisional Application Ser. No. 60/565,660, filed on Apr. 27, 2004.

FIELD OF INVENTION

The field of invention is molding compounds that are particularly suitable to be molded into an article that will produce heat and not burn when an electric current is passed through the article. These articles include applications in HVAC, seating, inductance heating and anti-fouling applications. These could include, but not be limited to items such as blower housings, stadium style seating, heated floors and wall and ceiling panels, ice guard, and low conductivity surfaces to inhibit barnacle growth or other undesired parasites. These compounds are generally liquid thermosetting molding resins typically characterized as bulk molding compositions ("BMC"), sheet molding compositions ("SMC"), and/or thick molding compositions ("TMC"). They can be used in molding processes such as compression, transfer, injection/compression molding and injection molding.

Products molded from the composition of this invention desirably have a resistance in the range of 1 to 10 ohms and preferably 1.5 to 7 ohms and more preferably 3.0 to 4.0 ohms when tested as 6"×6" by 0.125 "panels" as described herein and they achieve this resistance while maintaining flame retardance, preferably achieving a passable flame retardance value when tested in accordance with UL test # 94 V0 and 94 5V tested to a thickness of 0.060 inch. They also have adequate glass transition temperatures and desirable surface characteristics; heat, low temperature, corrosion and shrink resistance; low odor, sound damping strength; and cost. Desirably the compositions include a thermoset resin matrix such as a terephthalate polyester which can include blends of polyester and/or vinyl ester with a significant loading of conductive inorganic filler, typically graphite and optimally blends of graphites. The compositions also include flame and sound retardant additives, and glass fibers. They are further formulated to meet the desired molding characteristics; to withstand the operating temperatures to which they will be exposed; and to have a predetermined strength and a desirable user interface including appearance, and odor. Typically, the compounds will have a glass transition temperature from about 320° F. (160° C.) to about 343° F. (173° C.). compounds will have a glass transition temperature from about 320° F. (160° C.) to about 343° F. (173° C.).

The molding compositions in accordance with the invention can be formed into articles having complex configurations, including configurations with fluid curving lines and further which include integrally molded functional elements, such as rims, flanges, bosses, male and female mating parts. These articles can be relatively large and have the mechanical strength even at elevated temperatures to be self-supporting and to support other elements depending on the application. They also can incorporate the resistive heating quality into the molded article.

The invention also relates to articles which are molded from the previously described compounds. These molded articles include, but are not limited to combination heater/blower housings, air handlers, heating surfaces, ice guard, flooring, seating, and boat and dock surfaces.

BACKGROUND OF THE INVENTION

The present invention recognizes the manufacturing efficiency of molding complex parts from conductive polymeric compositions which can be subjected to a current to induce inductive heating or a mild current, and which are safe to use for these applications by virtue of the fact that they will not burn at the desired thickness. These compounds either replace metal structures that have typically been used for these applications and which require numerous bending, forming and machining processes, or even present the opportunity to develop new articles. For example, in the past, furnaces and air handlers have included a heater which runs in the vicinity of 1000° F. (538° C.), and a blower which expels the heated air from the heater. The housing for the blower has been formed from sheet metal. It typically has curving side walls joined at right angles to planar front and back walls. Thus, it requires complex fabrication steps to produce it. The present invention relates to a combination blower housing and heater. These functions are combined in a conductive molded blower housing that will generate heat in response to a low current. This blower can operate as the blower and heater and can maintain the same thermal efficiency while operating at temperatures ranging from about 250° F. (121° C.) to about 400° F. (204° C.), and more preferably in the range of from about 300° F. (149° C.) to about 350° F. (177° C.). These blower housings can reduce the height and width requirement by about two to about five inches for air handlers and thus have wider applications, including apartment and multiple residence dwellings. They are also useful in commercial heating applications. They have suitable strength, temperature and aesthetic characteristics to allow them to replace metal in known applications in the HVAC and other market areas. The housing can include surface perturbations such as ripples, grooves, or ribs, in the air flow channel which increase heat transfer and thereby improve the thermal efficiency of the furnace or air handler. The heating elements and connecting electrodes can be molded into the housing, further reducing fabrication steps.

There are further applications for these conductive molding compounds in providing alternatives to traditional conductive materials, which often involve greater labor expense to manufacture into complex parts. In particular, in instances where the demand justifies significant volumes of a product, polymer-molding expenses may prove far more cost effective than comparable machining and fabricating expenses for metal materials. However it is not a trivial task to achieve the desired level of conductivity, desirable molding characteristics and the critical safety requirements in one material. Generally, significant weight percentages of an appropriate filler in a polymeric matrix are necessary to achieve satisfactory levels of conductivity and for many applications and resins reinforcement, such as fiber, may be necessary to achieve the desired strength and corrosion resistance over the desired temperature range. However, these high load levels lead to problems with the strength, durability, and moldability and sound resistance of the resulting composition One area in particular where it would be beneficial to solve the previously mentioned strength, durability, and molding issues is for application in heating and air conditioning, as has been previously discussed. Additional heating applications include heated wall panels, ceiling panels, roofing underlayment, flooring and seating. For example, inductive heating is currently used for flooring in which a conductive mat is used under a ceramic tile floor. While ceramic tile may be beautiful, it is hard, and expensive. It is particularly expensive to install the previously described inductive heating means for large floor surfaces. The current invention would allow the mat to be made from sheet material that could be laid under tile, or could even be constructed directly into the floor as a sheet or as tile, with all of the advantages of a polymeric floor surface. Similarly, wall panels or ceiling panels could combine building functionality with the benefits of heating.

Another area that could benefit from the present invention is heated seating, such a stadium seating, or other outdoor applications, such as ski lifts. Bench seating can incorporate the heating sheet, or the composition can be molded into a contoured seat. In addition, the compounds could be useful for applications in which a mild current is desirable, such as for anti-fouling. The compounds could be molded into plates that are used on boat hulls, or docks to discourage barnacle growth, or could be incorporated directly into the hull or dock. Similarly, the material could be used to discourage birds from roosting on ledges if the material is used to induce a magnetic current.

SUMMARY OF THE INVENTION

The present invention provides conductive molding compositions that meet the safety, strength, and aesthetic requirements to allow for use in inductive and mildly to moderately conductive molded articles. These compounds are typically liquid thermoset resins with a moderate level of graphite or graphite blend to provide the desired conductivity. Additional additives include initiators, flame retardants, and reinforcing fillers and molding agents characteristics to permit the compositions to be molded into the desired shape by a variety of types of molding processes. Optimally, the base resin can include a polyester resin and more specifically can be a terephthalate polyester blended with a epoxy novalac vinyl ester and a loading of graphite of from about 10 to about 80%, and more desirably from about 20 to about 50%, and in particular about 35% to 45% by weight loading of graphite.

In particular, the formulations involve the use of a resin matrix with significant loadings of a conductive filler; various additional additives, such as flame retardants, sound dampeners, initiators, inhibitors, mold-release agents, shrink control additives, fiber reinforcement, viscosity agents, flow modifiers, thickeners, styrene, and carbon black or pigments or other desirable additives. The conductive filler is an inorganic filler which is desirably particulate graphite which is a blend. Conductive polymers may be used as a conductivity enhancer with the graphite. In addition depending on the application, silver coated ceramic fibers can be added to improve the overall electrical properties.

It is anticipated that properties such as the moldablity, coefficient of thermal expansion, electrical and thermal conductivity, shrink resistance and mechanical properties will be in the desired ranges as a result of the use of the present invention.

The foregoing improvements in specimens molded from these compositions enable the low cost mass production of articles used in the heating and surface low conductivity areas, and further allow for the combination of functions in a single article.

DETAILED DESCRIPTION OF THE INVENTION

The invention relates to improvements to conductive molding compositions for use in inductive heating and surface low conductivity applications, and to the articles that are made from these compositions. In particular, the compositions can be used in injection molding processes, in transfer molding, in compression molding processes, and in injection/compression molding processes. These processes are cost effective because they eliminate labor intensive machining, and because of repeatability with respect to shot to shot molding. The processes further have better ability to control shot to shot cross parting line thickness. Further these molding processes enable the production of complex configurations that have integral functional features and that have significant concentrations of fillers including conductive filler and fiber reinforcement.

Figure 1:
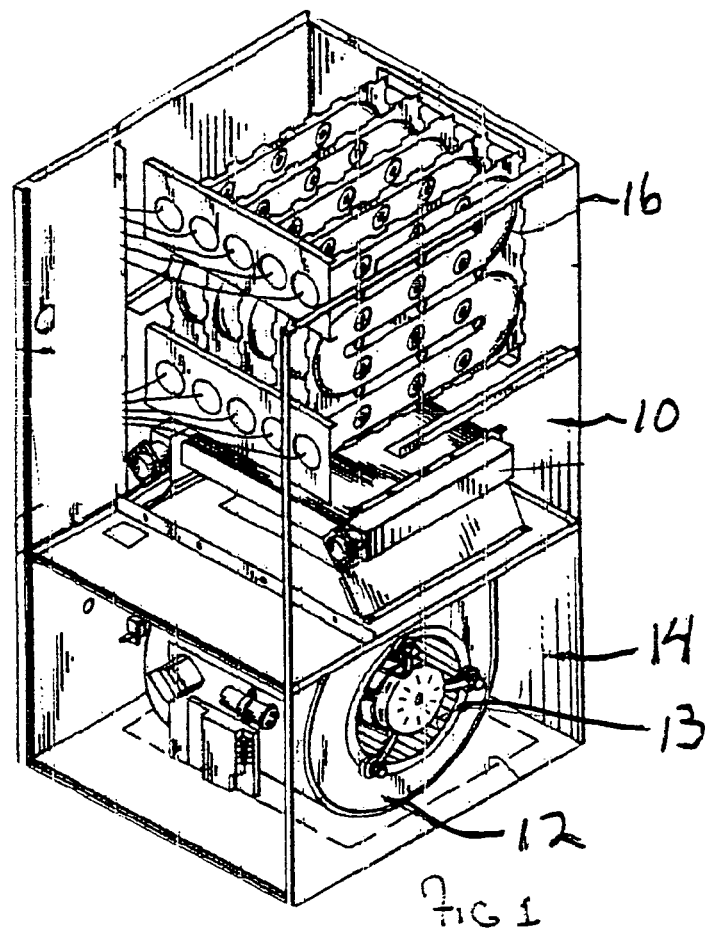
FIG. 1 is an illustration of a furnace incorporating a heater/blower housing that can be made in accordance with the present invention.
Figure 2:
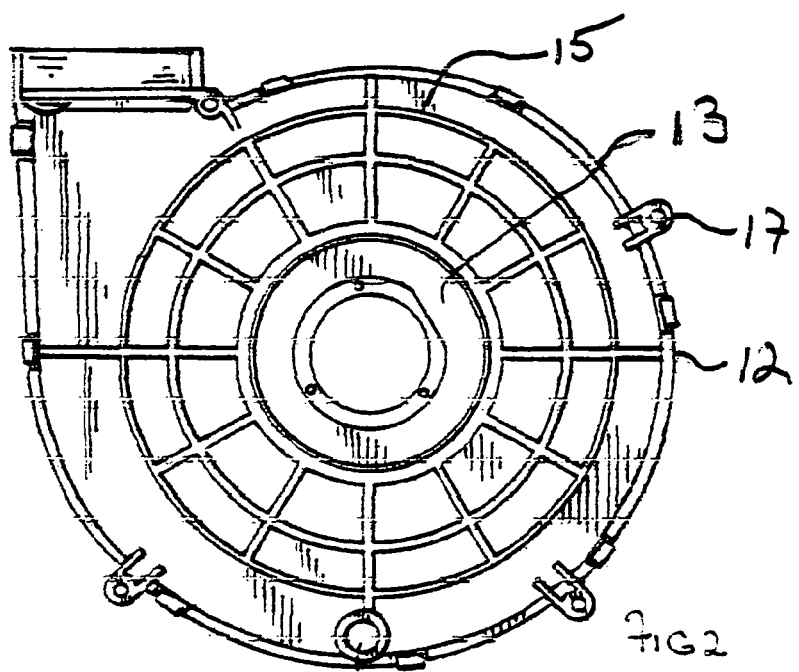
FIG. 2 is an illustration of the heater/blower housing of FIG. 1.

FIG. 1 shows a typical hot air furnace 10 of the prior art. This furnace includes the blower 13 is mounted within a housing 12 that supports the blower motor, and directs the air in the furnace cabinet 14. The air is directed over the heating coils 16 that can reach temperatures up to about 1,000° F. FIG. 2 shows a side view of the blower housing 12 which is shown as including the motor 13 and various integral mounting features, such as reinforcing ribs 15, and mounting flanges 17. In accordance with the present invention, the blower would be conductive, in order that a mild current could be applied to cause a resistance and induce heating in the blower itself. Thus, the need for the heating coils 16 would be entirely eliminated making the furnace much more cost efficient, and smaller.

Sheet molding and bulk molding compositions are described in U.S. Pat. Nos. 5,998,510; 5,342,554; 5,854,317; 5,744,816; and 5,268,400; all of which are hereby incorporated by reference for their teachings on the various modifications to molding compositions that are known to the art.

One component of the molding resin composition is a cross linkable prepolymer such as an unsaturated polyester resin or vinyl ester resin. Desirably the prepolymer has a relatively low molecular weight such as from about 200 to about 5000 (weight average) and a glass transition temperature from about 320° F. (160° C.) to about 343° F. (173° C.). They are described in detail with examples in the above patents incorporated by reference. The polyester resins are the condensation product derived from the condensation of unsaturated polybasic acids and/or anhydrides with polyols such as dihydroxy or trihydroxy compounds. Desirably, these polyester resins are the esterification reaction product of diacids, or anhydrides of diacids, generally having from about 3 to about 12, or more preferably from about 4 to about 8 carbon atoms, with a polyol or a cyclic ether having from about 2 to about 12, or more preferably from about 2 to about 6 carbon atoms.

In general, the vinyl ester resins that can be used are the reaction products of epoxy resins and a monofunctional ethlenically unsaturated carboxylic acid. More specifically, these vinyl ester resins are the reaction product of an epoxy terminated oligomer, for example, an epoxy functionalized bisphenol A with an acrylic acid, or methacrylic acid forming acrylic terminal groups on the oligomer. The vinyl esters have predominantly terminal unsaturation while the unsaturated polyesters have predominantly internal unsaturation.

Another component of the molding composition is one or more unsaturated monomer that is copolymerizable with the resin. Desirably, this component is capable of dissolving the resin component at room temperature. Thus, in one embodiment the resin is dissolved in the monomeric component prior to being combined with the remaining components. Examples of suitable monomers are styrene, alpha-methyl styrene, chloro-styrene, vinyl toluene, divinyl benzene, diallylphthalate, methyl methacrylate, and mixture of these, with preferred monomers being styrene and methyl methacrylate. The ratio of monomer(s) to resin is desirably from about 5:95 to about 50:50 and preferably from about 10:90 to about 25:75 by weight.

Another component to the molding composition is fillers. In accordance with the invention the predominant filler is a conductive filler in order to impart electrical conductivity of the final molded product. A preferred filler is graphite particles. Suitable graphite particles include both natural and synthetic graphite.

Particles are typically measured in microns at some diameter, or also by mesh size wherein a suitable mesh here is typically mostly smaller than about 60 mesh. In addition, silver coated ceramic fibers can be added to improve the overall electrical properties.

In particular, a synthetic crystalline graphite particle, such as currently supplied by applied Carbon of New Jersey under the trademark K100 and K112. The first is characterized as having 0.7 at 40 mesh (420 microns), 22% at 50 mesh (297 microns), 22% at 60 mesh (250 microns), 19% at 70 mesh (210 microns), 16% at 80 mesh (177 microns), 17% at 100 mesh (149 microns), and 2% at 200 mesh (74 microns). The second is characterized in having 0.5% at 40 mesh (420 microns), 18% at 50 mesh (297 microns), 15% at 60 mesh (250 microns), 12% at 70 mesh (210 microns), 9% at 80 mesh (177 microns), 9% at 100 mesh (149 microns), 23% at 200 mesh (74 microns), 9% at 325 mesh (44 microns) and 5% at −325 mesh (where the negative size indicates that the particulate is smaller than this mesh). Other graphites are sold by Asbury Graphite in Asbury, N.J. under the designations Asbury 4172 and 4811. This first graphite is characterized as having 55% at 50 mesh (297 microns), 22% at 60 mesh (250 microns), 16% at 70 mesh (210 microns), and 6% at 80 mesh (177 microns). The second graphite is characterized as having 36% at 100 mesh (149 microns), 45% at 200 mesh (74 microns), 12% at 325 mesh (44 microns), and 8% at −325 mesh (the negative sign denotes particles smaller than the designated mesh). Other graphite fillers might be used instead of or in addition to the preferred graphites, and include: Ashbury A99, Ashbury 3243, Ashbury modified 4012, Ashbury 3285, Ashbury 230U; TimrexR KS 75 and 150, and TimrexR KC 44, all sold by TIMCAL of Westlake, Ohio; and Calgraph Sold by SGL Technic Inc of Valencia, Calif. This filler is used at a loading of at least 10% by weight. Other conductive fillers such as other forms of graphite (including graphite pitch-based fibers), conductive polymer metal particles, or metal coat particles may be used in conjunction with the graphite filler. Desirably conductive fillers are at least about 10, about 20, or about 25 weight percent of the molding composition and up to 50 weight percent. Alternatively this amount can be expressed as at least about 10 phr, more preferably at least about 25, or 50 phr or even over 100 phr. Alternatively stated the conductive fillers are present in an effective amount to result in a bulk conductivity of at least about 1 to 25 ohms when measured as described in the examples for a 6" by 6" molded plaque having a thickness of about 0.125 inches. If necessary for a particular application these values can be increased by the addition of conductive enhancers such as silver coated ceramic fibers, like Ag-Fiber sold by Energy Strategy Associates of Florida, or conductive polymers such as poly-paraphenyleneimine based products sold under the Tyrosid 1000 designation by J. H. Hinz Company of Westlake, Ohio.

An initiator is another component of the molding composition. The initiator initiates the copolymerization of the resin and the monomer(s). Initiators include any free radical initiator capable of forming radicals in the correct concentration under the molding conditions. They may include peroxides, hydroperoxides, redox systems, diazo compounds, persulfates, perbenzoates etc. The initiators are typically used in amounts of about 0.05 to about 5 weight percent, and more preferably about 0.1 to about 2 weight percent. Alternatively, these amount can be expressed in parts per hundred parts by weight of resin, i.e. from about 0.5 to about 4.0 phr, preferably from about 0.7 to about 3.0 phr, and most preferably from about 0.8 to about 2.25 phr. Alternatively high temperature initiators such as Di-cup, e.g. dicumyl peroxide can be used for molding applications where higher initiation temperatures are desirable. Peroxy initiators are preferred.

The inclusion of 0.5 to 10 phr, preferably about 1 to 8 phr, of a mold release agent, such as Tech-lube HV706, calcium stearate, zinc stearate, or the like may also be of advantage to achieving without machining the complex molded part of the present invention. Tech-lube HV706 is proprietary composition of fatty acids, glycerides, polymeric resin and phosphate surfactant sold by Tech-nick Products of New Jersey. A viscosity reducer can be used in combination with styrene to maintain the molding properties, and the decrease the cost of the composition.

Another optional component to the improved molding composition is a Theological modifier, which may act to increase the molecular weight such as by chain extension of the resin prepolymer. Suitable modifiers include Group II oxides and hydroxides, such as calcium or magnesium oxide. These modifiers may act to reduce shear and thus promote flow in the composition during molding. Fumed silica is an example of a substance, which may act mechanically to increase molding viscosity and therefore also be a suitable rheological modifier either alone or in combination with the previously mentioned ingredients.

Desirably the rheological modifiers are used in an effective amount to enhance molding properties, such as thickening the resin system prior to molding. Desirable amounts of group II oxides (including group II hydroxides and mixtures of these compounds) is from about 0.1 to about 1 or about 2 weight percent, more desirably from about 0.2 or about 0.3 to about 0.7 or about 0.8 weight percent. This can also be expressed as from about 0.5 to about 4.0 phr, preferably from about 1.0 to about 3.0 phr, and most preferably from about 1.5 to about 2.5 phr. Specific preferred compounds include magnesium oxide, or magnesium hydroxide or calcium oxide. An example of a suitable magnesium oxide additive is 99% pure magnesium oxide sold under the trade name "Elastomag" from Morton Thiokol, Inc. in Danvers, Mass. Other examples include a magnesium oxide dispersion sold under the trade name "PG-9033" by Plasticolors, and a magnesium hydroxide dispersion also sold by Plasticolors under the trade name "PG-91146". Another suitable magnesium hydroxide is Barcroft, which is a powdered version. Fumed silica could be used at from about 0.5 to about 20 phr, preferably from about 1 to 10 phr.

Other components to the conductive molding composition include flame retardants such as decabromo flame retardants for example one sold under the tradename FR-1210 by Durr Marketing, used in the range of from about 5 to about 20 phr, and more preferably in the range of from about 7.5 to about 15 phr, and most preferably in the range of about 10 to about 15 phr. This can advantageously be combined with a synergist such as antimony trioxide such as SB203 sold by Durr Marketing and used in the range of from about 0.5 to about 10 phr, and preferably from about 1 to about 7.5 phr, and more preferably from about 3 to about 6 phr.

The composition also includes fibrous reinforcing agents such as cotton glass microfibers or graphite microfibers; flexibilizing agents; mold release agents; polymerization inhibitors to inhibit premature polymerization during storage or the initial stages of molding; viscosity modifiers like fumed silica; and mold lubricant like stearates of calcium, zinc or magnesium. The fibers may comprise chopped sized glass microfiber rovings at an amount below 20% for sound dampening, and preferably from about 10 to about 20%, and more preferably from about 15 to about 20% in particular for the combination blower housing/heater. The fibers are chopped to from about ⅛ to about ½ inch for BMC, to about ¼ to about 2 inches for SMC, and from about ¼ to about 1 inch for TMC. Carbon black may be added to influence the surface conductivity and to change the appearance of the molded product. Suitable carbon blacks include an electrically conductive low residue carbon black having a nitrogen surface area m2/g of 270, a STSA surface Area m2/g of 145 a sieve residue at 35 mesh of 0 ppm and at 325 mesh of 20 ppm as sold under the trade name Conductex 975 by Columbia Chemicals of Jamesburg, N.J. Also, suitable conductive carbon black is supplied by Akzo Nobel Chemicals of Chicago, Ill. under the trade name Ketjenblack EC-300 J and EC-600JD. Cabot Corporation of Boston Mass. and Applied Science of Cedarville, Ohio supply conductive carbon blacks. It is noted that polyethylene and fumed silica can function as the theological modifier in addition to the foregoing functions.

In addition, shrink control additives can advantageously be added to improve the surface characteristics and the dimensional stability of the resulting products. These shrink control additives include "anti-shrink" and "low profile additives" as part of this aspect of the invention. These additives generally include thermoplastics or elastomerics such as homopolymers of ethylene, styrene, vinyl toluene, alkyl methacrylates, polyethylene ether, polyphenylene oxide and alkyl acrylates. Additional examples include copolymers using the foregoing and in addition, vinyl chloride, vinyl acetate, acrylonitrile, and butadiene. In particular these co-polymers would advantageously include copolymers of vinyl chloride and vinyl acetate; styrene and acrylonitrile; methyl methacrylate and alkyl esters of acrylic acid; methyl methacrylate and styrene; methyl methacrylate and acrylamide; and SBS block copolymers. Particularly advantageous additives are thermoplastics, with saturated polyesters being preferred among these. These additives are generally used in the range of 10 to 50 weight percent based on the total weight of the additive and the resin system, i.e. the resin and any monomers. More preferably this range would be 20 to 45 weight percent, with a particularly preferred range of about 30 to 40 weight percent. These additives are usually added with the resin blending. As necessary the cure system may be adjusted to compensate for the presence of the additive.

The molding compositions may be formulated and mixed using a variety of mixing conditions including either continuous or batch and using a variety of known mixing equipment. Specific examples are set forth in the example section. The compositions may be advantageously stored for reasonable times before molding. The compositions can be molded by a variety of methods including compression, transfer, and injection molding or combinations of theses techniques. The compositions can be molded under typical conditions for these types of molding including at pressures from about 400 to about 9000 psi, and preferably from about 2000 to about 3500 psi, and most preferably from about 2500 to about 3000 psi and temperatures at from about 225 to about 400 degrees Fahrenheit. Dwell times are from about 10 seconds to about four minutes.

Otherwise conventional injection molding techniques apply as is discussed for example in U.S. Pat. No. 6,365,069 B2 incorporated by reference herein. It is preferable to avoid temperature variations at the mold level. At normal cure rates, the mold time for injection molding is typically around 5 to 600 seconds, or more usually 30 to 300 seconds or around one or two minutes. The process can be practiced for single or double gate cavity tools, or even for injection/compression processes in which the mold is slightly opened during fill and the mold is shut to compress the shot.

The articles from the composition desirably have tensile strength from about 2000 to about 6000 psi as measured in accordance with ASTM test No. D638 and flexural modulus from about 3000 to about 10,000 psi when tested in accordance with ASTM test no. D790.

Molded products made from the compositions of the present invention are useful for a variety of applications demanding complex configurations, conductivity, as well as strength, and corrosion resistance. One particularly advantageous product, which can be made by compression molding, is a combination heater blower housing shown in FIG. 1. This housing combines the function of a heater with the blower housing of the prior art. The housing is typically molded in two parts and fitted together.

The following compositions are examples of ingredients that could be used in the composition of the present composition: Suitable resins may include, but not be limited to the following: Hetron 922 is available from Ashland Chemical Co in Columbus Ohio. It is a low viscosity epoxy vinyl ester resin. It is about 55 wt. % solids and about 45 wt. % reactive monomer. Atlac 382ES is a resin from Reichhold Chemicals, Inc. in Research Triangle Park, N.C. It is characterized as a bisphenol fumarate resin. It is diluted to about 55 wt. % solids with styrene. Dion 6694 is a resin diluted to 55 wt. % solids in styrene. It is available from Reichhold Chemicals, Inc. It is characterized as a modified bisphenol fumarate polyester. Resin 42-2641 is available from Cook Composites and Polymers in Kansas City, Mo. It is diluted to 55 wt. % solids with styrene. It is characterized as an unsaturated polyester resin. ATLAC 3581-61 is sold by Reichhold Chemicals, Inc. It is characterized as a vinyl ester resin at 19 wt %, polyester at 27 wt % and urethane polymer at 4 wt % combined with 50 wt % styrene. Thus, it is diluted to 50 wt % solids with styrene. 580-05 is a resin from Reichhold Chemicals, Inc. It is characterized as a urethane-modified vinyl ester resin. It is diluted to 54 wt % solids with styrene. 9100 is a resin from Reichhold Chemicals, Inc. It is characterized as a bisphenol-epoxy vinyl ester. It is diluted to 54–58 wt % solids with styrene. Dow Derakane R8084 from Dow Chemicals, Inc. It is characterized as an elastomer-modified vinyl ester resin. It is diluted to 50–60 wt % solids with styrene. 9480-00 from is from Reichhold Chemicals, Inc. It is characterized as an epoxy novolac vinyl ester. It is diluted to 53.5 wt % solids with styrene.

31632 is from Reichhold Chemicals, Inc. It is characterized as a isocyanurate vinyl ester resin with 4wt % polyether polyol. It is diluted to 60 wt % solids with styrene.

Dow Derakane 797 from Dow Chemicals, Inc. It is characterized as a one pack resin which is an epoxy vinyl ester resin containing 7–13 weight percent of divinyl benzene, 5–15 weight percent of styrene butadiene rubber co-polymer, 2–6 weight percent of styrene homopolymer, and 0.5 to 1.5 weight percent of styrene-ethylene oxide block copolymer, as a low profile additive. It is diluted to 60–65 wt % solids with styrene. Dow Derakane 790 from Dow Chemicals, Inc. It is also characterized as a one pack resin which is an epoxy vinyl ester resin containing 5–15 weight percent of styrene butadiene rubber co-polymer, 2–6 weight percent of styrene homopolymer, and 0.5 to 1.5 weight percent of styrene-ethylene oxide block copolymer, as a low profile additive. It is diluted to 50–60 wt % solids with styrene. 31633-00 from Reichhold Chemicals, Inc. It is characterized as a isocyanurate vinyl ester resin with 4 wt % polyether polyol. It is diluted to 60 wt % solids with styrene. Derakane 780 is from Dow Chemicals, Inc. It is also characterized as a vinyl ester resin. It is diluted to 60–70 wt % solids with styrene. Polylite is from Reichhold Chemicals, Inc. Altac-G380 is from Reichhold Chemicals, Inc. Derakane 790 is from Dow Chemicals, Inc.

These resins can be combined with monomers, such as styrene, or Divinylbenzene HP from the Dow Chemical Company and characterized as 80 wt % divinyl benzene, 18 wt % ethylvinylbenzene, less than 0.12 wt % p-tert butyl-catechol, less than 0.5 wt % diethylbenzene and less than 1 wt % of Naphthalene.

In addition, rheological modifiers can be used and include Elastomag from Morton Thiokol. Inc. in Danvers, Mass. It is characterized as 99% pure magnesium oxide The modifiers could also include FN-510, a linear low-density polyethylene from Equistar Chemicals, L.P. of Houston, Tex. and fumed silica, such as Cab-o-sil silica.

Suitable initiators include Vazo (2,2-azo bisisobutyronitrile) available from Dupont, I & B Industrial and Biochemical Dept, Wilmington Del., tert-butyl peroxy isopropyl carbonate (Triginox BPIC) available from Durr Marketing in Pittsburgh, Pa., t-butylperbenzoate (TBPB) available from Durr Marketing, and 1,3 di-t-butyl peroxy-3,5,5 trimethyl-cyclohexane catalyst (Trig 29B75) available from Durr Marketing.

Calcium stearate and zinc stearate sold as COAD 27 by the Norac Company, Incorporated of Azusa, California can be used as mold release agents, as can Tech-Lube HV-706, which is a proprietary composition of fatty acids, glycerides, polymeric resin and phosphate surfactant.

Suitable graphite products include graphite 4012 available from Asbury Graphite in Asbury, N.J. It is characterized by having less than 10% greater than 150 microns and less than 10% smaller than 44 microns in diameter; SGL Ash02 characterized as a natural graphite flake product sold by SGL Corporation; XC-72.SGLV Fine characterized as a natural graphite flake product sold by SGL Corporation; conductive graphite flake available from Asbury Graphite in Asbury, N.J. under the trade designation 3243 and characterized by having less than 18% greater than 75 microns and less than 65% smaller than 44 microns in diameter; conductive flake graphite available from Asbury Graphite in Asbury, N.J. under the trade designation 230U and characterized by having 100% smaller than 44 microns in diameter; a synthetic graphite available from Asbury Graphite in Asbury, N.J. under the trade designation A99 and characterized by having less than 3% greater than 44 microns and less than 99% smaller than 44 microns in diameter; a synthetic graphite available under the designation KS 75, from Timrex America, Inc. and characterized by having less than 95% greater than 96 microns and less than 95% smaller than 75 microns in diameter; a synthetic graphite available under the designation KS 150, from Timrex America, Inc. and characterized by having at least 95% less than 180 microns in diameter; a synthetic graphite available under the designation KC44, from Timrex America, Inc. and characterized by having at least 90% less than 48 microns in diameter; a graphite available under the designation Timrex KS5-75TT from TimCal Ltd. of Bodio, Switzerland and characterized as having a particle distribution with d10 of 9.1 µm, a d50 of 38.8 µm, and a d90 of 70 µm, as determined by laser diffraction (Malvern); a synthetic graphite available under the designation of K103 from Applied Carbon Technology and having a particle size distribution characterized as 1.0% max at +80 mesh, 10.% max at 100 mesh and 10.0% max at −325 mesh; a graphite available under the designation Graphco from Asbury Graphite Mills having a particle size distribution characterized as 0.34% at +30 mesh, 58.9% at +50 mesh, 25.2% at +60 mesh, 10.9% at +80 mesh, and 5.7% at −80 mesh; a graphite available under the designation Graphite Sales FP143 or ElCarbo100 from Graphite Sales of Nova, Ohio and having a particle size distribution characterized as 5% at 2 mm, 30% at 0.8 mm, 50% at 0.2 mm, and 10% at pan; a graphite available under the designation Asbury T SO333 from Asbury Graphite Mills and characterized as having a particle distribution of 0.17% at screen 100; 54.90% at screen 200; 30.5% at screen 325, and a pan of 14.43%; a graphite available under the designation Asbury 4461 from Asbury Graphite Mills and characterized as having a particle distribution of 0.05% at +60 mesh; 35.52% of +100 mesh; 44.82% at +200 mesh; 11.77% at +325 mesh, and 7.9% at −325 mesh; a graphite available under the designation Asbury 3285 from Asbury Graphite Mills and characterized as having a particle distribution of 0.05% at +100 mesh; 10.46% at +200 mesh; 29.22% at +325 mesh, and 60.32% at −325 mesh; a graphite available under the designation Asbury 4592 from Asbury Graphite Mills and characterized as having a particle distribution of 0.02% at +60 mesh; 0.04% at +80 mesh; 0.78% at +100 mesh; 96.12% at +200 mesh; 1.3% at +325 mesh, and 1.74% at −325 mesh; a graphite available under the designation Asbury 4172 from Asbury Graphite Mills and characterized as having a particle distribution of 0.34% at +30 mesh; 54.87% at +50 mesh; 21.52% at +60 mesh; 16.19% at +70 mesh; 5.7% at +80 mesh; 1.38% at −80 mesh, and 1.45% at −200 mesh; a graphite available under the designation Asbury 4811 from Asbury Graphite Mills and characterized as having a particle distribution of 0.05% at +60 mesh; 35.52% at +100 mesh; 44.82% at +200 mesh; 11.77% at +325 mesh, and 7.9% at −325 mesh; a synthetic graphite available under the designation K100 from Applied Carbon Technology of Sommerville, N.J. and characterized as having a typical particle distribution of 0.18% at +30 mesh; 0.51–0.69% at +40 mesh; 22.16–24.98% at +50 mesh; 19.51%–22.17% at +60 mesh; 17.98%–19.77% at +70 mesh; 15.05%–15.84% at +80 mesh; 14.04%–17.84% at +100 mesh; 3.38%–5.62% at +200 mesh; 0.03% at+325 mesh, and 0.15%–0.50% at −325 mesh; a graphite available under the designation K112 from Applied Carbon Technology and characterized as having a typical particle distribution of 0.14% at +30 mesh; 0.48% at +40 mesh; 17.62% at +50 mesh; 14.53% at +60 mesh; 12.05% at +70 mesh; 9.47% at +80 mesh; 8.89% at +100 mesh; 23.12% at +200 mesh; 8.87% +325 mesh, and 4.83% at −325 mesh; and a graphite available under the designation Asbury 4580 from Asbury Graphite Mills and characterized as having a typical particle distribution of 0.05% at +10 mesh; 11.92% at +20 mesh; 62.33% at +30 mesh, and 25.64 at −30 mesh.

Carbon blacks can be used and include is a conductive carbon black nano fiber supplied under the trade name Pyrograph Applied Sciences, Inc. of Cedarville, Ohio; an electrically conductive low residue carbon black having a nitrogen surface area m2/g of 270, a STSA surface Area m2/g of 145 a sieve residue at 35 mesh of 0 ppm and at 325 mesh of 20 ppm as sold under the trade name Conductex 975 by Columbia Chemicals of Jamesburg, N.J.; conductive carbon black supplied by Cabot Corporation of Boston, Mass. under the trade name, Black Pearls; conductive carbon black supplied by Akzo Nobel Chemicals of Chicago, Ill. under the trade name Ketjenblack EC-300 J and EC-600JD. EC-300 J has an iodine absorption of 740–840 mg/g; a pore volume of 310–345 cm3/100 g and an apparent bulk density of 125–145 kg/m3. EC-600 JD has an iodine absorption of 1000–1150 mg/g; a pore volume of 480–510 cm3/100 g and an apparent bulk density of 100–120 kg/m3.

EXAMPLES

The following examples use the components set forth below.

Resin A is 31009,terephatic resin sold by Reichhold.

Resin B is Dow Derakane 780 from Dow Chemicals, Inc. It is also characterized as a epoxy novalac vinyl ester resin. It was diluted to 60–70 wt % solids with styrene.

Resin C is Q-8000 is a saturated polyester from Ashland Chemical.

Monomer A is styrene.

These ingredients are added together to comprise the base resin for 100 phr.

Flame retardant A is FR-121-(DBDPO)

Synergist A is Antimony Trioxide

Flow modifier A is FN-510, a linear low-density polyethylene from Equistar Chemicals, L.P. of Houston, Tex.

Initiator A is tert-Amyl peroxy-2-ethylhexanoate in a diluent of odorless mineral spirits, which is used as a catalyst (Trig 121 C-75) available from Durr Marketing.

Initiator B is tert-butyl peroxy isopropyl carbonate (Triginox BPIC) available from Durr Marketing in Pittsburgh, Pa.

Inhibitor A is 91029 is BHT from Plasticolors.

Inhibitor B is 9139 is PBQ from Plasticolors.

Viscosity reducer A is BY-W-996 from BYK Chemie.

Mold release agent A is calcium stearate from Norac.

Graphite A is a synthetic graphite available under the designation K100 from Applied Carbon Technology of Sommerville, N.J. It is characterized as having a typical particle distribution of 0.18% at +30 mesh; 0.51–0.69% at +40 mesh; 22.16–24.98% at +50 mesh; 19.51%–22.17% at +60 mesh; 17.98%–19.77% at +70 mesh; 15.05%–15.84% at +80 mesh; 14.04%–17.84% at +100 mesh; 3.38%–5.62% at +200 mesh; 0.03% at+325 mesh, and 0.15%–0.50% at −325 mesh.

Graphite B is graphite 4012 available from Asbury Graphite in Asbury, N.J. It is characterized by having less than 10% greater than 150 microns and less than 10% smaller than 44 microns in diameter.

Thickener A is PG-9033P is a mag oxide dispersion from Plasticolors.

Glass fibers used are 973C-AB-113. The Glass fibers were from Owens-Corning Fiberglass and are characterized as continuous glass filaments hammer milled into a specific length used as a reinforcing and filler medium.

The molding compositions are generally prepared by adding the resin, monomer, initiator, inhibitor, mold release agent, and rheological modifier (if present) to a high shear cowls disperser and blending for 2 minutes at approximately 3,200 rpm. The conductive filler is added to the mix in a Baker Perkin, or Littleford continuous mixer and mixed 10 to 15 minutes. A Readco mixer can also be used and the ingredients can be ported in separately or added at the same time under cowls. When mixing is complete the composition is put in a suitable barrier bag and allowed to mature for approximately one day before molding.

The molding parameters for the molding compositions are as follows: General molding temperatures for 12"×12" plaques at 0.125 inch was 280° F. up to 370° F. with a molding time of 3 minutes down to 108 seconds depending on the initiator and a charge weight of from 450 to 500 g. Preferably, the molding temperature for plaques was 310° F. with a molding time of about two minutes and a charge weight of 500 g.

Figure 8:
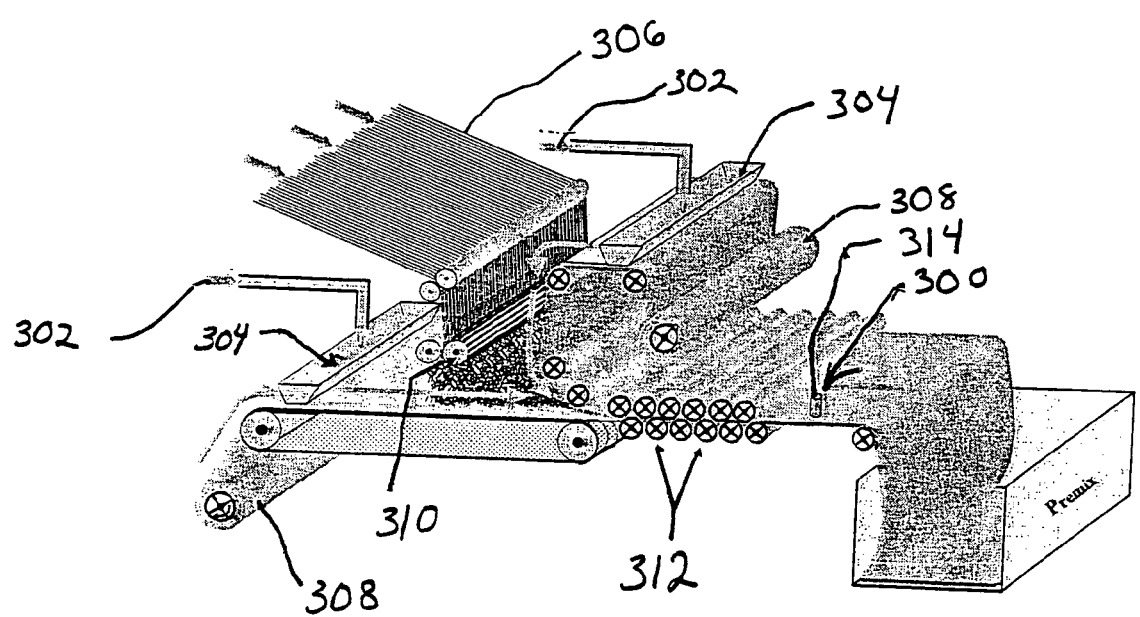
FIG. 8 is a SMC machine which can be used which to compound the present invention.

The following procedure was used as an SMC pilot paste preparation for SL-790-Z6 compound as an example procedure:

The resin components were added to a 5 gallon pail with the initiator and the first of the inhibitor and blended under a Cowels disperser at approximately 3,200 rpm and then half of the graphite was slowly added, and then the flame retardants were added with continued blending. The thickener was slowly added and the remainder of the graphite and the mix was blended to a temperature of 110° F. Prior to running on a SMC machine, the thickener as added and the mix was blended for 2 minutes. The SMC machine 300 shown in FIG. 8 was started and run at a rate of 6 meters per minute. Equal parts of the paste 302 was transferred to SMC machine doctor boxes 304. Glass rovings 306 were fed onto a carrier film 308 with the resin from chopper blades 310. The glass chopper 310 was started when the poly with the paste deposited on it reached the chopper zone. After the glass was deposited it then meets the paste and poly from the upper doctor box where the two components go through a compaction zone 312 to get sandwiched between two carrier films 308 to wet out the glass fibers. The thickness was measured using a gamma gauge 314. The resulting compound was wound onto a cardboard core and packaged in a box for later use. This was molded into test panels and also into prototype heater/blower housings.

Table I sets forth recipes of compositions and conductivity results in accordance with the present invention which were tested for molding into heater/blower housings.

| INGREDIENTS | SL-790-X2 | SL-790-X2 PHR | SL-790-X3 | SL-790-X3 PHR | SL-790-X4 | SL-790-X4 PHR | SL-790-Y9 | SL-790-Y9 PHR |
|---|---|---|---|---|---|---|---|---|
| 31009 | 18.53 | 46.01 | 16.33 | 43.82 | 17.53 | 43.53 | 18.19 | 45.17 |
| 780 | 6.59 | 16.36 | 6.02 | 16.15 | 5.59 | 13.88 | 6.26 | 15.55 |
| Q-8000 HP-DVB | 11.4 | 28.31 | 10.17 | 27.29 | 9.4 | 23.34 | 11.07 | 27.49 |
| STYRENE | 3.75 | 9.31 | 4.75 | 12.74 | 7.75 | 19.25 | 4.75 | 11.80 |
| PHR CHECK |  | 100.00 |  | 100.00 |  | 100.00 |  | 100.00 |
| FR-1210(DBDPO) |  |  |  |  |  |  |  |  |
| SB203 Antimony Trioxide |  |  |  |  |  |  |  |  |
| FN-510 | 1.04 | 2.58 | 1.04 | 2.79 | 1.04 | 2.58 | 1.04 | 2.58 |
| TRIG 121C-75 | 0.18 | 0.45 | 0.18 | 0.48 | 0.18 | 0.45 | 0.18 | 0.45 |
| TRIG BPIC | 0.18 | 0.45 | 0.18 | 0.48 | 0.18 | 0.45 | 0.18 | 0.45 |
| IN-91029 | 0.1 | 0.25 | 0.1 | 0.27 | 0.1 | 0.25 | 0.1 | 0.25 |
| IN-9139 | 0.18 | 0.45 | 0.18 | 0.48 | 0.18 | 0.45 | 0.18 | 0.45 |
| BYK-W-996 | 0.8 | 1.99 | 0.8 | 2.15 | 0.8 | 1.99 | 0.8 | 1.99 |
| CAST | 1.5 | 3.72 | 1.5 | 4.02 | 1.5 | 3.72 | 1.5 | 3.72 |
| K-100 GRAPHITE | 40 | 99.33 | 45 | 120.74 |  |  | 20 | 49.66 |
| 4012 GRAPHITE |  |  |  |  | 40 | 99.33 | 20 | 49.66 |
| PG-9033P | 0.75 | 1.86 | 0.75 | 2.01 | 0.75 | 1.86 | 0.75 | 1.86 |
| 973C-AB-113 | 15 | 37.25 | 15 | 40.25 | 15 | 37.25 | 15 | 37.25 |
| PHR COND. MEDIA |  | 99.33 |  | 120.74 |  | 99.33 |  | 99.33 |
| PHR NON-COND. MEDIA |  | 148.99 |  | 152.94 |  | 148.99 |  | 148.99 |
| ohms (plaques) |  | 0.68 |  | 0.42 |  | 5.5 |  | 1.6 |
| ohms (Actual Housing) |  |  |  |  |  |  |  |  |

| INGREDIENTS | SL-790-Z1 | SL-790-Z1 PHR | SL-790-Z2 | SL-790-Z2 PHR | SL-790-Z3 | SL-790-Z3 PHR | SL-790-Z4 | SL-790-Z4 PHR |
|---|---|---|---|---|---|---|---|---|
| 31009 | 18.19 | 45.17 | 15.69 | 45.78 | 15.69 | 45.78 | 13.75 | 43.97 |
| 780 | 6.26 | 15.55 | 5.26 | 15.35 | 5.26 | 15.35 | 4.4 | 14.07 |
| Q-8000 HP-DVB | 11.07 | 27.49 | 8.57 | 25.01 | 8.57 | 25.01 | 7.37 | 23.57 |
| STYRENE | 4.75 | 11.80 | 4.75 | 13.86 | 4.75 | 13.86 | 5.75 | 18.39 |
| PHR CHECK |  | 100.00 |  | 100.00 |  | 100.00 |  | 100.00 |
| FR-1210(DBDPO) |  |  | 4 | 11.67 | 4 | 11.67 | 4 | 12.79 |
| SB203 Antimony Trioxide |  |  | 2 | 5.84 | 2 | 5.84 | 2 | 6.40 |
| FN-510 | 1.04 | 2.58 | 1.04 | 3.03 | 1.04 | 3.03 | 1.04 | 3.33 |
| TRIG 121C-75 | 0.18 | 0.45 | 0.18 | 0.53 | 0.18 | 0.53 | 0.18 | 0.58 |
| TRIG BPIC | 0.18 | 0.45 | 0.18 | 0.53 | 0.18 | 0.53 | 0.18 | 0.58 |
| IN-91029 | 0.1 | 0.25 | 0.1 | 0.29 | 0.1 | 0.29 | 0.1 | 0.32 |
| IN-9139 | 0.18 | 0.45 | 0.18 | 0.53 | 0.18 | 0.53 | 0.18 | 0.58 |
| BYK-W-996 | 0.8 | 1.99 | 0.8 | 2.33 | 0.8 | 2.33 | 0.8 | 2.56 |
| CAST | 1.5 | 3.72 | 1.5 | 4.38 | 1.5 | 4.38 | 1.5 | 4.80 |
| K-100 GRAPHITE | 15 | 37.25 | 20 | 58.36 | 15 | 43.77 | 43 | 137.51 |
| 4012 GRAPHITE | 25 | 62.08 | 20 | 58.36 | 25 | 72.95 |  |  |
| PG-9033P | 0.75 | 1.86 | 0.75 | 2.19 | 0.75 | 2.19 | 0.75 | 2.40 |
| 973C-AB-113 | 15 | 37.25 | 15 | 43.77 | 15 | 43.77 | 15 | 47.97 |
| PHR COND. MEDIA |  | 99.33 |  | 116.72 |  | 116.72 |  | 137.51 |
| PHR NON-COND. MEDIA |  | 148.99 |  | 175.08 |  | 175.08 |  | 182.28 |
| ohms (plaques) |  | 1.84 |  | 4.25 |  |  |  |  |
| ohms (Actual Housing) |  |  |  |  |  |  |  |  |

| INGREDIENTS | SL-791-A6 | SL-791-A6 PHR | SL-791-A7 | SL-791-A7 PHR | SL-791-A8 | SL-791-A8 PHR | SL-791-A9 |
|---|---|---|---|---|---|---|---|
| 31009 | 17.34 | 44.27 | 16.34 | 45.18 | 14.18 | 41.50 | 14.52 |
| 780 | 6.91 | 17.64 | 5.91 | 16.34 | 5.08 | 14.87 | 5.41 |
| Q-8000 HP-DVB | 10.22 | 26.09 | 9.22 | 25.49 | 8.21 | 24.03 | 8.54 |
| STYRENE | 4.7 | 12.00 | 4.7 | 12.99 | 6.7 | 19.61 | 5.7 |
| PHR CHECK |  | 100.00 |  | 100.00 |  | 100.00 |  |
| FR-1210(DBDPO) | 4 | 10.21 | 4 | 11.06 | 4 | 11.71 | 4 |
| SB203 Antimony Trioxide | 2 | 5.11 | 2 | 5.53 | 2 | 5.85 | 2 |
| FN-510 | 1.04 | 2.66 | 1.04 | 2.88 | 1.04 | 3.04 | 1.04 |
| TRIG 121C-75 | 0.18 | 0.46 | 0.18 | 0.50 | 0.18 | 0.53 | 0.18 |
| TRIG BPIC | 0.18 | 0.46 | 0.18 | 0.50 | 0.18 | 0.53 | 0.18 |
| IN-91029 | 0.1 | 0.26 | 0.1 | 0.28 | 0.1 | 0.29 | 0.1 |
| IN-9139 | 0.18 | 0.46 | 0.18 | 0.50 | 0.18 | 0.53 | 0.18 |
| BYK-W-996 | 0.8 | 2.04 | 0.8 | 2.21 | 0.8 | 2.34 | 0.8 |

-continued

| INGREDIENTS | | | | | | | |
|---|---|---|---|---|---|---|---|
| CAST K-100 GRAPHITE | 1.5 | 3.83 | 1.5 | 4.15 | 1.5 | 4.39 | 1.5 |
| 4012 GRAPHITE | 35 | 89.35 | 35 | 96.77 | 37 | 108.28 | 35 |
| PG-9033P | 0.85 | 2.17 | 0.85 | 2.35 | 0.85 | 2.49 | 0.85 |
| 973C-AB-113 | 15 | 38.29 | 18 | 49.76 | 18 | 52.68 | 20 |
| PHR COND. MEDIA | | 89.35 | | 96.77 | | 108.28 | |
| PHR NON-COND. MEDIA | | 165.94 | | 179.71 | | 184.37 | |
| ohms (plaques) | | | | | | | |
| ohms (Actual Housing) | | | | | | | |

| INGREDIENTS | SL-791-A9 PHR | SL-791-B5 | SL-791-B5 PHR | SL-791-B6 | SL-791-B6 PHR | SL-791-B7 | SL-791-B7 PHR |
|---|---|---|---|---|---|---|---|
| 31009 | 42.49 | 17.34 | 44.27 | 15.52 | 41.75 | 16.34 | 45.18 |
| 780 | 15.83 | 6.91 | 17.64 | 6.41 | 17.25 | 5.91 | 16.34 |
| Q-8000 | 24.99 | 10.22 | 26.09 | 9.54 | 25.67 | 9.22 | 25.49 |
| HP-DVB | | | | | | | |
| STYRENE | 16.68 | 4.7 | 12.00 | 5.7 | 15.33 | 4.7 | 12.99 |
| PHR CHECK | 100.00 | | 100.00 | | 100.00 | | 100.00 |
| FR-1210(DBDPO) | 11.71 | 5 | 12.76 | 5 | 13.45 | 5 | 13.82 |
| SB203 Antimony Trioxide | 5.85 | 3 | 7.66 | 3 | 8.07 | 3 | 8.29 |
| FN-510 | 3.04 | 1.04 | 2.66 | 1.04 | 2.80 | 1.04 | 2.88 |
| TRIG 121C-75 | 0.53 | 0.18 | 0.46 | 0.18 | 0.48 | 0.18 | 0.50 |
| TRIG BPIC | 0.53 | 0.18 | 0.46 | 0.18 | 0.48 | 0.18 | 0.50 |
| IN-91029 | 0.29 | 0.1 | 0.26 | 0.1 | 0.27 | 0.1 | 0.28 |
| IN-9139 | 0.53 | 0.18 | 0.46 | 0.18 | 0.48 | 0.18 | 0.50 |
| BYK-W-996 | 2.34 | 0.8 | 2.04 | 0.8 | 2.15 | 0.8 | 2.21 |
| CAST K-100 GRAPHITE | 4.39 | 1.5 | 3.83 | 1.5 | 4.04 | 1.5 | 4.15 |
| 4012 GRAPHITE | 102.43 | 30 | 76.59 | 30 | 80.71 | 36 | 99.53 |
| PG-9033P | 2.49 | 0.85 | 2.17 | 0.85 | 2.29 | 0.85 | 2.35 |
| 973C-AB-113 | 58.53 | 18 | 45.95 | 20 | 53.81 | 15 | 41.47 |
| PHR COND. MEDIA | 102.43 | | 76.59 | | 80.71 | | 99.53 |
| PHR NON-COND. MEDIA | 190.23 | | 178.71 | | 188.32 | | 176.94 |
| ohms (plaques) | 3.9 | | 22.7 | | 9.65 | | 8.8 |
| ohms (Actual Housing) | 1.6 | | 3.9 | | | | |

| INGREDIENTS | HI TEMP SL-791-C6 | HI TEMP SL-791-C6 PHR | HI TEMP SL-791-G1 | SL-790-Z5 | SL-790-Z5 PHR | SL-790-Z6 | SL-790-Z6 PHR |
|---|---|---|---|---|---|---|---|
| 31009 | 17.61 | 44.06 | 17.95 | 15.69 | 45.78 | 15.69 | 45.78 |
| 780 | 7.18 | 17.96 | 7.51 | 5.26 | 15.35 | 5.26 | 15.35 |
| Q-8000 | 10.48 | 26.22 | 10.81 | 8.57 | 25.01 | 8.57 | 25.01 |
| HP-DVB | 2.5 | 5.50 | 2.5 | | | | |
| STYRENE | 2.2 | 6.26 | 2.2 | 4.75 | 13.86 | 4.75 | 13.86 |
| PHR CHECK | | 100.00 | | | 100.00 | | 100.00 |
| FR-1210(DBDPO) | 5 | 12.51 | 5 | 4 | 11.67 | 4 | 11.67 |
| SB203 Antimony Trioxide | 3 | 7.51 | 3 | 2 | 5.84 | 2 | 5.84 |
| FN-510 | 1.04 | 2.60 | 1.04 | 1.04 | 3.03 | 1.04 | 3.03 |
| TRIG 121C-75 | 0.18 | 0.45 | 0.18 | 0.18 | 0.53 | 0.18 | 0.53 |
| TRIG BPIC | 0.18 | 0.45 | 0.18 | 0.18 | 0.53 | 0.18 | 0.53 |
| IN-91029 | 0.1 | 0.25 | 0.1 | 0.1 | 0.29 | 0.1 | 0.29 |
| IN-9139 | 0.18 | 0.45 | 0.18 | 0.18 | 0.53 | 0.18 | 0.53 |
| BYK-W-996 | | | | 0.8 | 2.33 | 0.8 | 2.33 |
| CAST K-100 GRAPHITE | 1.5 | 3.75 | 1.5 | 1.5 | 4.38 | 1.5 | 4.38 |
| 4012 GRAPHITE | 30 | 75.06 | 25 | 40 | 116.72 | 35 | 102.13 |
| PG-9033P | 0.85 | 2.13 | 0.85 | 0.75 | 2.19 | 0.75 | 2.19 |
| 973C-AB-113 | 18 | 45.03 | 22 | 15 | 43.77 | 15 | 43.77 |
| PHR COND. MEDIA | | 75.06 | | | 116.72 | 5 | 14.59 |
| PHR NON-COND. MEDIA | | 175.13 | | | 175.08 | | 175.08 |
| ohms (plaques) | | 21 | | | | | 2.04 |
| ohms (Actual Housing) | | 4.5 | | | | | 1 |

| INGREDIENTS | SL-791 A4 | SL-791-A4 PHR | SL-791 A5 | SL-791-A5 PHR | HI TEMP SL-791-G1 PHR | HI TEMP SL-791-G2 | HI TEMP SL-791-G2 PHR |
|---|---|---|---|---|---|---|---|
| 31009 | 15.02 | 43.89 | 15.02 | 43.89 | 43.81 | 18.62 | 43.33 |
| 780 | 4.6 | 13.44 | 4.6 | 13.44 | 18.33 | 8.18 | 19.04 |

-continued

| | | | | | | | |
|---|---|---|---|---|---|---|---|
| Q-8000 | 7.9 | 23.09 | 7.9 | 23.09 | 26.39 | 11.47 | 26.69 |
| HP-DVB | | | | | 6.10 | 2.5 | 5.82 |
| STYRENE | 6.7 | 19.58 | 6.7 | 19.58 | 5.37 | 2.2 | 5.12 |
| PHR CHECK | | 100.00 | | 100.00 | 100.00 | | 100.00 |
| FR-1210(DBDPO) | 4 | 11.69 | 4 | 11.69 | 12.20 | 5 | 11.64 |
| SB203 Antimony Trioxide | 2 | 5.84 | 2 | 5.84 | 7.32 | 3 | 6.98 |
| FN-510 | 1.04 | 3.04 | 1.04 | 3.04 | 2.53 | 1.04 | 2.42 |
| TRIG 121C-75 | 0.18 | 0.53 | 0.18 | 0.53 | 0.44 | 0.18 | 0.42 |
| TRIG BPIC | 0.18 | 0.53 | 0.18 | 0.53 | 0.44 | 0.18 | 0.42 |
| IN-91029 | 0.1 | 0.29 | 0.1 | 0.29 | 0.24 | 0.1 | 0.23 |
| IN-9139 | 0.18 | 0.53 | 0.18 | 0.53 | 0.44 | 0.18 | 0.42 |
| BYK-W-996 | 0.8 | 2.34 | 0.8 | 2.34 | | | |
| CAST | 1.5 | 4.38 | 1.5 | 4.38 | 3.66 | 1.5 | 3.49 |
| K-100 GRAPHITE | 5 | 14.61 | | | | | |
| 4012 GRAPHITE | 35 | 102.28 | 40 | 116.89 | 61.02 | 20 | 46.54 |
| PG-9033P | 0.8 | 2.34 | 0.8 | 2.34 | 2.07 | 0.85 | 1.98 |
| 973C-AB-113 | 15 | 43.83 | 15 | 43.83 | 53.70 | 25 | 58.18 |
| PHR COND. MEDIA | | 116.89 | | 116.89 | 61.02 | | 46.54 |
| PHR NON-COND. MEDIA | | 175.34 | | 175.34 | 183.04 | | 186.18 |
| ohms (plaques) | | 6.9 | | | | | |
| ohms (Actual Housing) | | 3.2 | | | | | |

Figure 3:
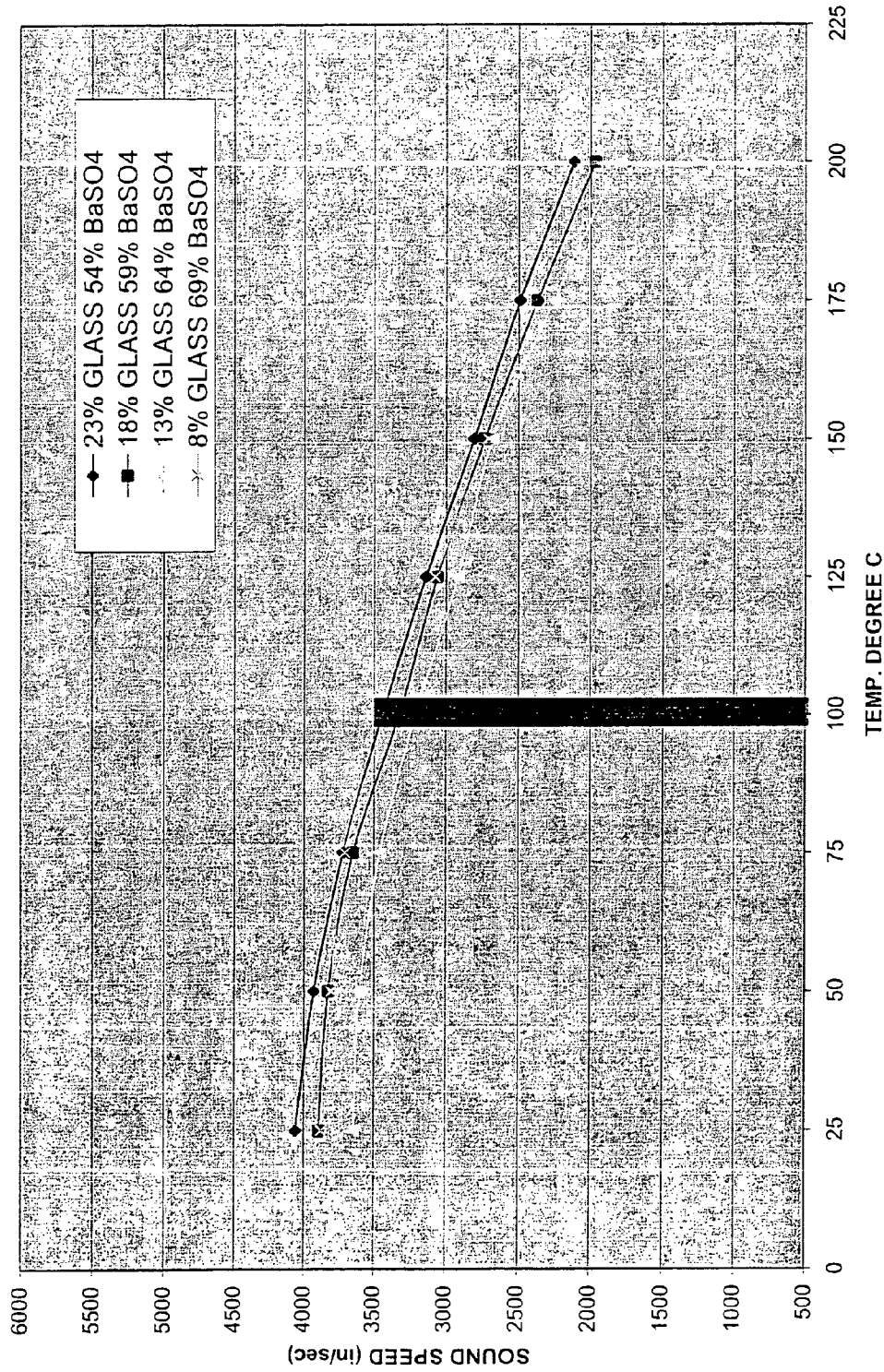
FIG. 3 is a graph of the sound speed versus temperature for a composition having loadings of glass fiber ranging between 8% and 23%.
Figure 4:
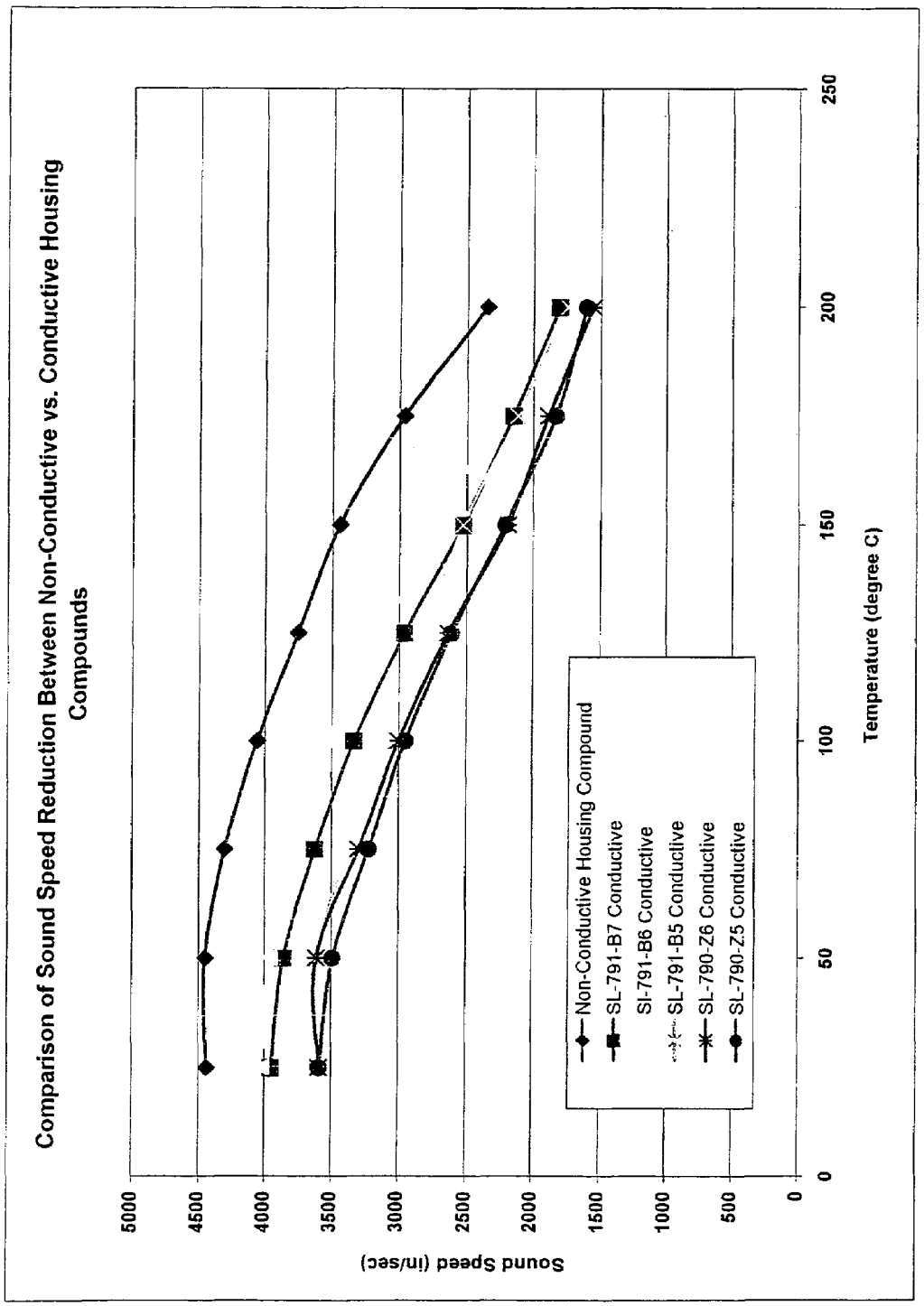
FIG. 4 is a similar graph comparing conductive and non-conductive compounds.
Figure 5:
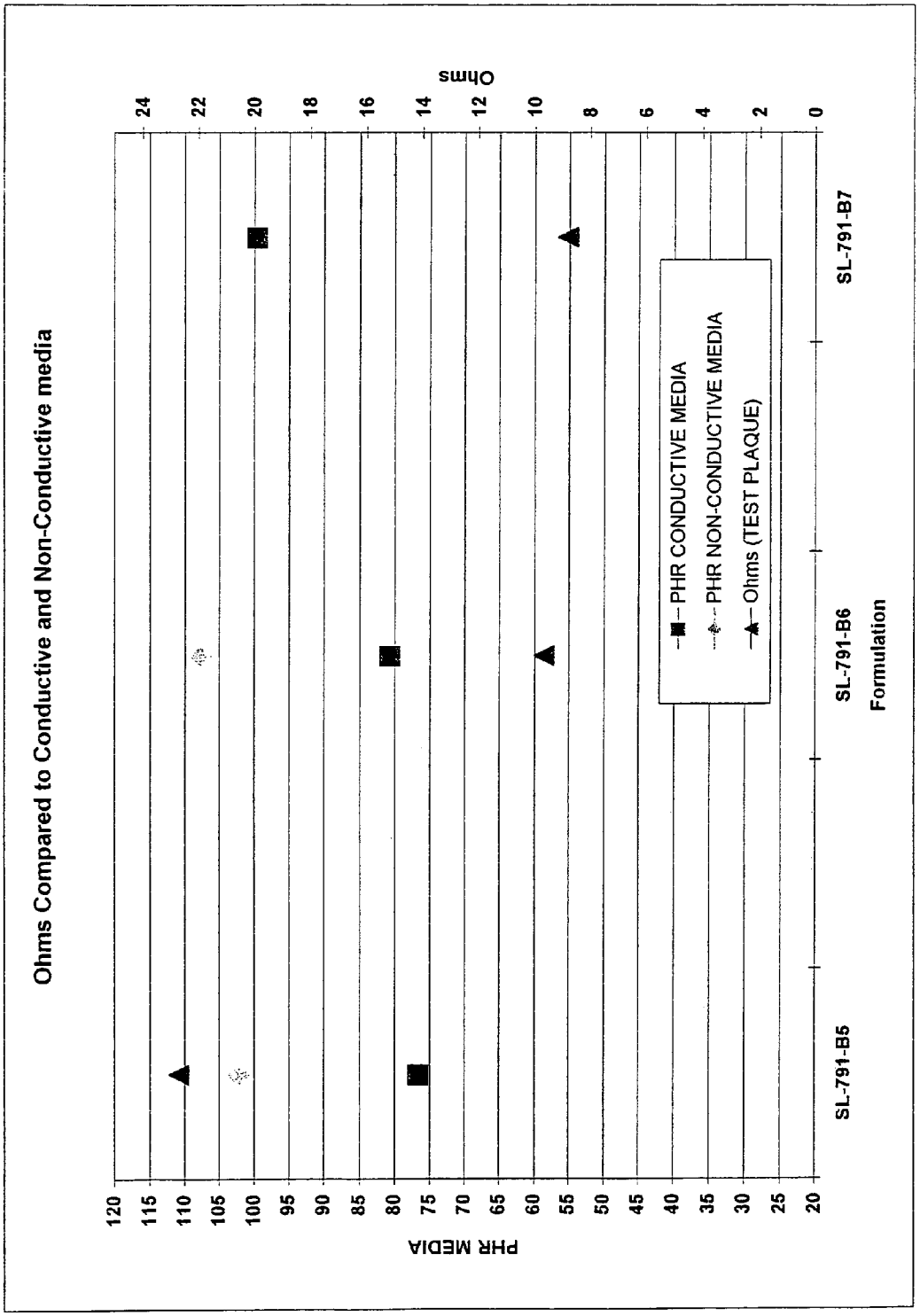
FIG. 5 is a graph showing the conductance of conductive and non-conductive media for test plaques.
Figure 6:
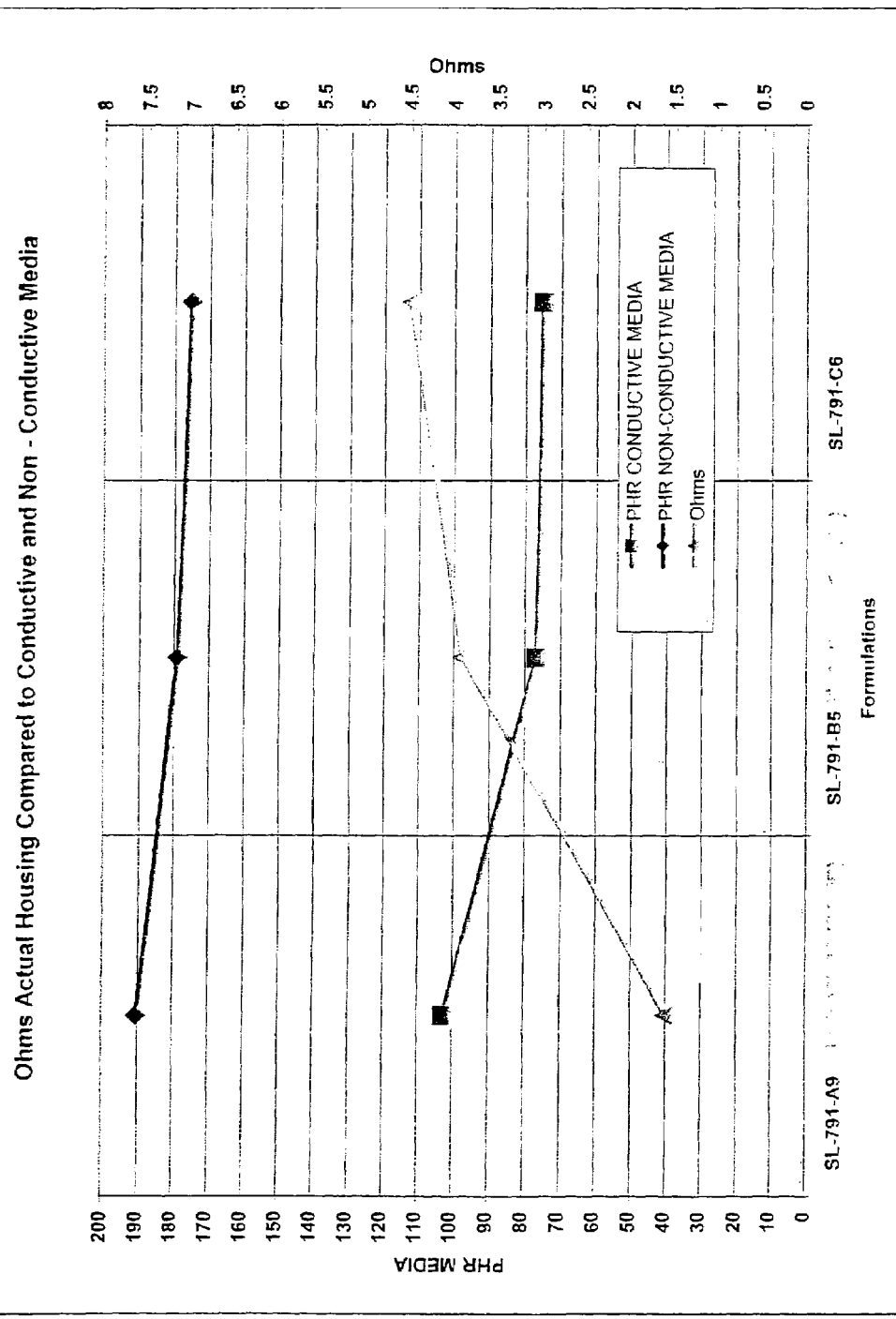
FIG. 6 is a graph showing the conductance for actual housing molded from conductive and non-conductive housings.
Figure 7:
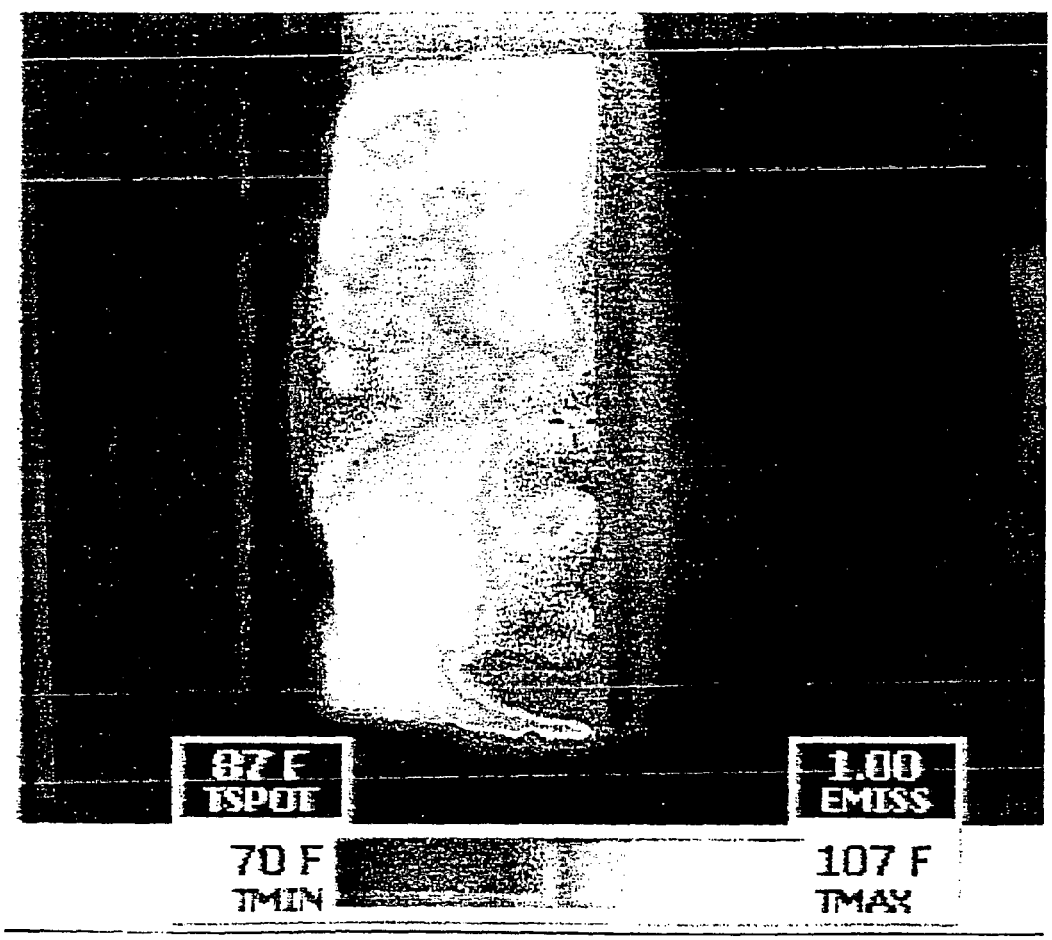
FIG. 7 is a thermal picture of an actual heater/blower housing molded using a compound in accordance with the present invention.

FIG. 3 is a graph of the sound speed versus temperature for a resin composition testing various loadings of glass fibers and correspondingly decreased loadings of another filler, BaSO$_4$. A similar graph is shown for various compositions comparing conductive and non-conductive compounds in FIG. 4. The plots indicate the somewhat complex relationship between loading and sound transmission. FIGS. 5 and 6 are graphs showing the conductive of various formulations for test plaques and actual housings.

Table II shows mechanical property testing on Conductive SMCs. The specimens used for testing were cut from 12×12×0.125 inch panels that were molded in the standard method.

TABLE II

| Mechanical | SL791-A4 | | SL791-A5 | |
|---|---|---|---|---|
| Property | X | SD | X | SD |
| Tensile Strength (psi) | 4807.14 | 706.65 | 5097.50 | 1132.40 |
| Tensile Mod. (psi × 10$^6$) | 0.87 | 0.16 | 1.02 | 0.08 |
| % Elongation (percent) | 0.80 | 0.33 | 0.89 | 0.31 |
| Tensile Energy (psi) | 25.01 | 14.39 | 33.33 | 17.70 |
| Flex Strength (psi) | 13456.63 | 3096.88 | 13700.25 | 2947.58 |
| Flex Mod. (psi × 10$^6$) | 0.87 | 0.10 | 0.94 | 0.07 |
| Notched Izod (ft-lbs/in) | 7.57 | 2.01 | 8.69 | 1.96 |
| Unnotched Izod (ft-lbs/in) | 11.98 | 4.26 | 14.75 | 4.54 |

| Mechanical | SL791-A6 | | SL791-A7 | |
|---|---|---|---|---|
| Property | X | SD | X | SD |
| Tensile Strength (psi) | 4966.25 | 801.16 | 5983.75 | 2198.74 |
| Tensile Mod. (psi × 10$^6$) | 0.95 | 0.08 | 1.16 | 0.20 |
| % Elongation (percent) | 0.71 | 0.14 | 0.74 | 0.37 |
| Tensile Energy (psi) | 21.30 | 6.31 | 32.78 | 27.55 |
| Flex Strength (psi) | 12184.57 | 1630.66 | 17144.38 | 5025.52 |
| Flex Mod. (psi × 10$^6$) | 0.87 | 0.05 | 0.94 | 0.12 |
| Notched Izod (ft-lbs/in) | 9.15 | 3.02 | 12.31 | 2.87 |
| Unnotched Izod (ft-lbs/in) | 12.33 | 2.12 | 14.18 | 4.79 |

Table III shows results from flammability testing using samples molded in the standard method and tested according to UL's Test for Flammability of Plastic Materials for Parts in Devices and Applicances. The specimens were conditioned to the first conditioning period (48hrs @ 23° C.) only to help meet the date needed.

Past data has shown no difference in results between the two conditioning periods. If the table recites "NR" testing was Not Required because: 1) testing of the same compound passed at a lower thickness, 2) testing of the same compound failed at a higher thickness. In the parenthesis following a "NR" is the assumed testing result. A hypen shows results from a needed recheck because of a failure. The minimum passing result for each compound is listed in bold.

TABLE III

| Compound | Series | Batch | Test Type | Thickness | Result |
|---|---|---|---|---|---|
| SL791-A4 | EXP - 15 | 1 (pilot) | V-0 | 0.060 | Fail - Fail |
| | | | | 0.080 | Pass |
| | | | | 0.100 | NR (Pass) |
| | | | 5V | 0.060 | Pass |
| | | | | 0.080 | NR (Pass) |
| | | | | 0.100 | NR (Pass) |
| SL791-A5 | EXP - 15 | 1 (pilot) | V-0 | 0.060 | Fail - Fail |
| | | | | 0.080 | Pass |
| | | | | 0.100 | NR (Pass) |
| | | | 5V | 0.060 | Pass |
| | | | | 0.080 | NR (Pass) |
| | | | | 0.100 | NR (Pass) |
| SL791-A6 | EXP - 15 | 1 (pilot) | V-0 | 0.060 | Fail - Fail |
| | | | | 0.080 | Fail - Fail |
| | | | | 0.100 | Pass |
| | | | 5V | 0.060 | Fail - Pass |
| | | | | 0.080 | NR (Pass) |
| | | | | 0.100 | NR (Pass) |
| SL791-A7 | EXP - 18 | 1 (pilot) | V-0 | 0.060 | Fail - Fail |
| | | | | 0.080 | Fail - Fail |
| | | | | 0.100 | Pass |
| | | | 5V | 0.060 | Pass |
| | | | | 0.080 | NR (Pass) |
| | | | | 0.100 | NR (Pass) |

Table IV sets forth Mechanical Property testing as set forth in Table II but for SMC with varying amounts of K100 graphite.

TABLE IV

| Mechanical Property | SL790-Z4 X | SL790-Z4 SD | SL790-Z5 X | SL790-Z5 SD | SL790-Z6 X | SL790-Z6 SD |
|---|---|---|---|---|---|---|
| Tensile Strength (psi) | 3612.50 | 1255.61 | 5662.50 | 796.86 | 3705.00 | 933.61 |
| Tensile Mod. (psi × $10^6$) | 1.03 | 0.09 | 1.18 | 0.19 | 1.03 | 0.21 |
| % Elongation (percent) | 0.53 | 0.38 | 0.69 | 0.11 | 0.42 | 0.15 |
| Tensile Energy (psi) | 9.85 | 7.25 | 28.55 | 10.34 | 10.21 | 6.79 |
| Flex Strength (psi) | 9557.63 | 3339.44 | 11461.88 | 2629.28 | 9752.25 | 3754.08 |
| Flex Mod. (psi × $10^6$) | 0.76 | 0.09 | 0.79 | 0.12 | 0.71 | 0.10 |
| Notched Izod (ft-lbs/in) | 5.67 | 1.21 | 6.02 | 1.63 | 6.06 | 1.48 |
| Unnotched Izod (ft-lbs/in) | 9.08 | 4.16 | 9.33 | 3.83 | 9.53 | 2.50 |

Table V sets forth the results of flammability testing for the compounds of Table IV and according to the description for Table III.

TABLE V

| Compound | Series | Batch | Test Type | Thickness | Result |
|---|---|---|---|---|---|
| SL790-Z4 | EXP-15 | 1 | V-0 | 0.060 | ALL PASS |
| | | | | 0.080 | |
| | | | | 0.100 | |
| | | | 5V | 0.060 | ALL PASS |
| | | | | 0.080 | |
| | | | | 0.100 | |
| SL790-Z5 | EXP-15 | 1 | V-0 | 0.060 | ALL PASS |
| | | | | 0.080 | |
| | | | | 0.100 | |
| | | | 5V | 0.060 | ALL PASS |
| | | | | 0.080 | |
| | | | | 0.100 | |
| SL790-Z6 | EXP-15 | 1 | V-0 | 0.060 | ALL PASS |
| | | | | 0.080 | |
| | | | | 0.100 | |
| | | | 5V | 0.060 | ALL PASS |
| | | | | 0.080 | |
| | | | | 0.100 | |

Additional flammability testing results are set forth in Tables VI, VII, and VIII.

TABLE VI

| Compound | Series | Lot No. | Test Type | Thickness | Result |
|---|---|---|---|---|---|
| SL790-Y9 | Exp-15 | 7-14-03-1 (LAB) | V-0 | 0.060 | NR (Fail) |
| | | | | 0.080 | NR (Fail) |
| | | | | 0.100 | Fail - Fail |
| | | | 5V | 0.060 | NR (Fail) |
| | | | | 0.080 | NR (Fail) |
| | | | | 0.100 | Fail - Fail |
| SL790-Z1 | | | V-0 | 0.060 | NR (Fail) |
| | | | | 0.080 | NR (Fail) |
| | | | | 0.100 | Fail - Fail |
| | | | 5V | 0.060 | NR (Fail) |
| | | | | 0.080 | NR (Fail) |
| | | | | 0.100 | Fail - Fail |

TABLE VI-continued

| Compound | Series | Lot No. | Test Type | Thickness | Result |
|---|---|---|---|---|---|
| SL790-Z2 | | | V-0 | 0.060 | Pass |
| | | | | 0.080 | NR (Pass) |
| | | | | 0.100 | NR (Pass) |
| | | | 5V | 0.060 | Pass |
| | | | | 0.080 | NR (Pass) |
| | | | | 0.100 | NR (Pass) |
| SL790-Z3 | | | V-0 | 0.060 | Pass |
| | | | | 0.080 | NR (Pass) |
| | | | | 0.100 | NR (Pass) |
| | | | 5V | 0.060 | Pass |
| | | | | 0.080 | NR (Pass) |
| | | | | 0.100 | NR (Pass) |

TABLE VII

SAMPLE DESCRIPTION

| SL-791-A8 SMC | Exp-18 | 37% 4012Graphite/DBDPO/SB |
| SL-791-A9 SMC | Exp-20 | 35% 4012Graphite/DBDPO/SB |

RESULTS

| Compound | Thickness | Test Type | Result |
|---|---|---|---|
| SL-791-A8 | 0.060 | V-0 | Pass |
| | | 5V | Pass |
| SL-791-A9 | 0.060 | V-0 | Fail/recheck Fail |
| | | 5V | Pass |
| | 0.080 | V-0 | Pass |

TABLE VIII

SAMPLE DESCRIPTION

| SL-791-B5 SMC | Exp-18 | 30% 4012Graphite/DBDPO/SB |
| SL-791-B6 SMC | Exp-20 | 30% 4012Graphite/DBDPO/SB |
| SL-791-B7 SMC | Exp-15 | 36% 4012/DBDPO/SB |

RESULTS

| Compound | Thickness | Test Type | Result |
|---|---|---|---|
| SL-791-B5 | 0.060 | V-0 | Pass |
| | | 5V | Pass |
| SL-791-B6 | 0.060 | V-0 | Pass |
| | | 5V | Pass |
| SL-791-B7 | 0.060 | V-0 | Fail/recheck Fail |
| | | 5V | Pass |
| | 0.080 | V-0 | Pass |

Testing was performed according to ASTM standards for rigid plastics. Additional tests were run to study the effect of graphite loading and particle size with a preliminary ohm target of 2 ohms, in particular for use as a combination heater/blower housing. The test method to determine through surface conductivity was the same as used to determine the values presented for the plaques in Table I and uses a ohm meter forming a circuit with to ¼ to ½ braided copper strap bonded to opposing parallel ground sides at the top, and in line with the edge of a 6" by 6" by 0.125" plaque with the copper strap being bonded to each ground side by silver filled epoxy adhesive. This method is meant to be the method for determining the through surface conductivity for the claims. The results are set forth below in Table IX

| Formulation | Graphite % | K-1100%/ 250 mic | 4012/ 75 μ | 94 5V .060" | Ohms | Glass % |
|---|---|---|---|---|---|---|
| SL790-Y9 | 40 | 20 | 20 | fail | 1.3 | 15 |
| SL790-X4 | 43 | 43 | 0 | pass | 31 | 15 |
| SL-790-Z2 | 40 | 20 | 20 | pass | 2.2 | 15 |
| SL-790-Z3 | 40 | 15 | 25 | pass | 2.2 | 15 |
| SL-790-Z6 | 40 | 35 | 5 | pass | 1.5 | 15 |

While in accordance with the Patent Statutes, the best mode and preferred embodiment have been set forth, the scope of the invention is not limited thereto, but rather by the scope of the attached claims.

The invention claimed is:

1. A blower housing comprising:
   a) an unsaturated prepolymer resin which comprises a blend of an unsaturated polyester and a vinyl ester resin;
   b) an unsaturated material copolymerizable with said resin and including a terminal ethylene group;
   c) from about 10 to about 200 parts by weight of graphite based upon 100 parts of resin, which is the weight of a) and b);
   d) an initiator to initiate said copolymerization; and
   e) a flame retardant.

2. A blower housing as set forth in claim 1 wherein the graphite is present in from about 25 to about 100 parts by weight based upon 100 parts by weight of resin.

3. A blower housing as set forth in claim 2 further comprising glass fiber.

4. A blower housing as set forth in claim 3 wherein the amount of glass fiber is from about 10 to about 70 parts by weight based upon 100 parts by weight of resin.

5. A blower housing as set forth in claim 4 wherein the amount of glass fiber is from about 20 to about 35 parts by weight based upon 100 parts by weight of resin.

6. A blower housing as set forth in claim 1 wherein the prepolymer comprises a polyester terephthlate blended with an unsaturated polyester.

7. A blower housing as set forth in claim 6 wherein the ratio of polyester terephthlate to unsaturated polyester is from about 9:95 to about 25:75.

8. A blower housing as set forth in claim 7 wherein the flame retardant is antimony trioxide.

9. A blower housing as set forth in claim 8 wherein the antimony trioxide is present in an amount of from about 5 parts to about 20 parts by weight based upon 100 parts by weight of resin.

* * * * *